Sept. 22, 1970   E. W. WEIGMANN   3,529,791
APPARATUS FOR POSITIONING THE ENGINES OF SHORT AND
VERTICAL TAKE-OFF AIRCRAFT
Filed Sept. 16, 1968   3 Sheets-Sheet 1

Sept. 22, 1970　　　E. W. WEIGMANN　　　3,529,791
APPARATUS FOR POSITIONING THE ENGINES OF SHORT AND
VERTICAL TAKE-OFF AIRCRAFT
Filed Sept. 16, 1968　　　　　　　　　　3 Sheets-Sheet 3

3,529,791
APPARATUS FOR POSITIONING THE ENGINES OF SHORT AND VERTICAL TAKE-OFF AIRCRAFT
Erich W. Weigmann, Munich, Germany, assignor to Entwicklungsring Sud G.m.b.H., Munich, Germany
Filed Sept. 16, 1968, Ser. No. 759,956
Claims priority, application Germany, Sept. 26, 1967, 1,531,398
Int. Cl. B64d 27/20
U.S. Cl. 244—54                                4 Claims

ABSTRACT OF THE DISCLOSURE

An apparatus for positioning the lift engines of a short or vertical take-off aircraft. The illustrated apparatus includes a linkage mechanism, the driving axis of which lies in a plane which is nonparallel to the driven axis. The linkage mechanism is hingedly secured to a mounted support provided upon the engines and is actuated by a hydraulic cylinder. Actuation of the hydraulic cylinder correspondingly causes the engines to move along a guide track which is supported upon the engine compartment door. The engines are thus moved through an arcuate angle of more than 160 degrees.

BACKGROUND OF THE INVENTION

This invention relates to a device for positioning the lift engines from a position within the nacelle of an aircraft to an exterior position. With respect to short and/or vertical take-off aircraft, the engines may be provided in multiples for the generation of lift or thrust.

Various means for extending or swinging the jet engines of an aircraft between a storage and an operational position are known. The objective of the illustrated embodiment is to improve such known arrangements by including certain space-saving features and by providing a more favorable spatial arrangement. The angle of swing of the engines is increased to approximately 160 to 180 degrees without incorporating an additional gear drive system. To achieve this feature, the illustrated embodiment includes a linkage mechanism whose driving axis lies in a plane which is not normal to the driven axis. This linkage mechanism permits the engines to swing out more than 160 degrees along a guide track provided upon the extended engine compartment door without the inclusion of excessive drive mechanisms and components.

With respect to the illustrated embodiment, the linkage mechanism is operated by only one, preferably hydraulic, actuating cylinder, and the linkage mechanism is hinged to the swivel arm of the engines. The swivel arm includes a guide track and a roller for guiding the engines during their positioning.

Various other features and advantages of the invention will become apparent with reference to the following description and accompanying drawings which show an illustrative embodiment of this invention.

DESCRIPTION OF THE PREFERRED EMBODIMENT

Figure 1:
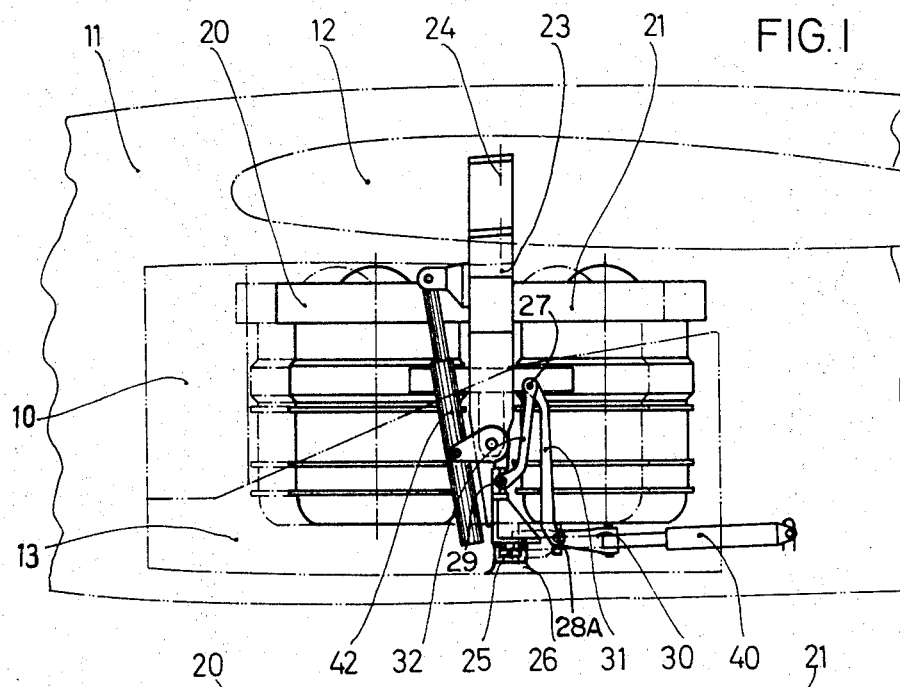
FIG. 1 is a partial view of an aircraft including certain features of this invention with the engines retracted into a compartment provided in the airframe.
Figure 2:
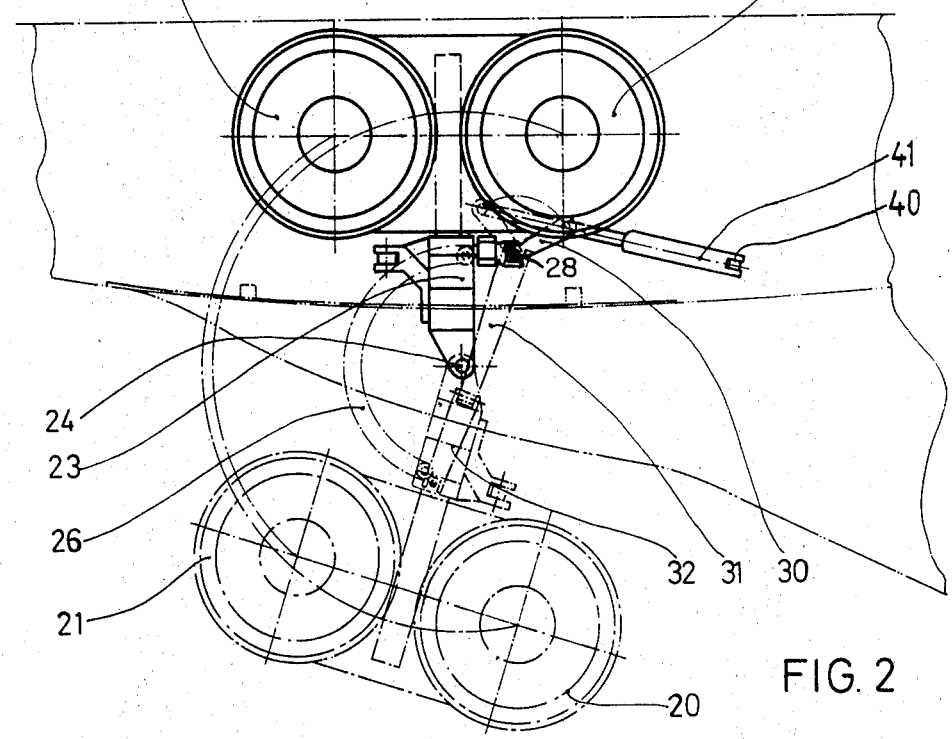
FIG. 2 is a top view of the aircraft illustrated in FIG. 1 with the engines shown in phantom in their extended position.
Figure 3:
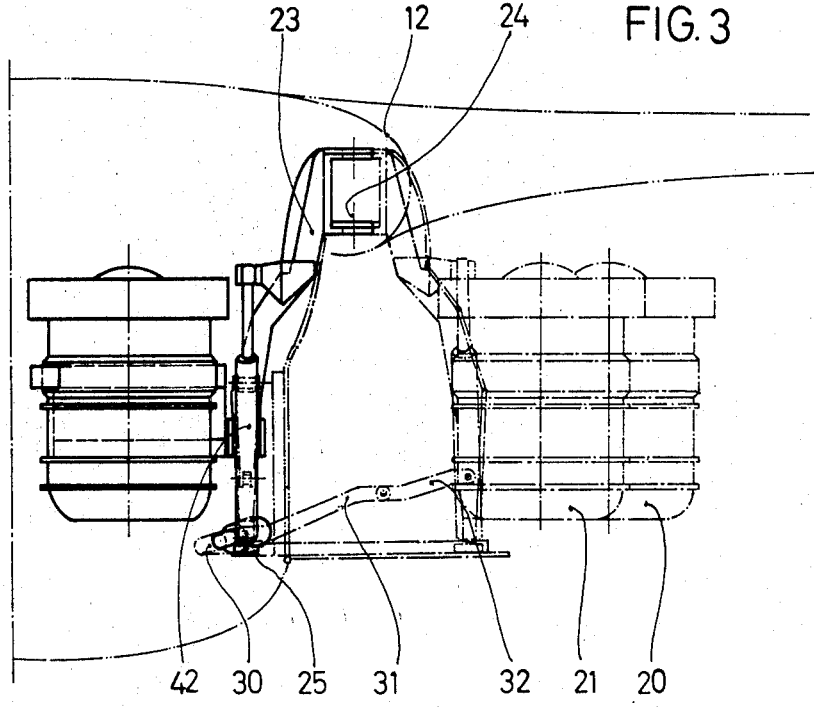
FIG. 3 is a side view of the apparatus illustrated in FIG. 1.
Figure 6:
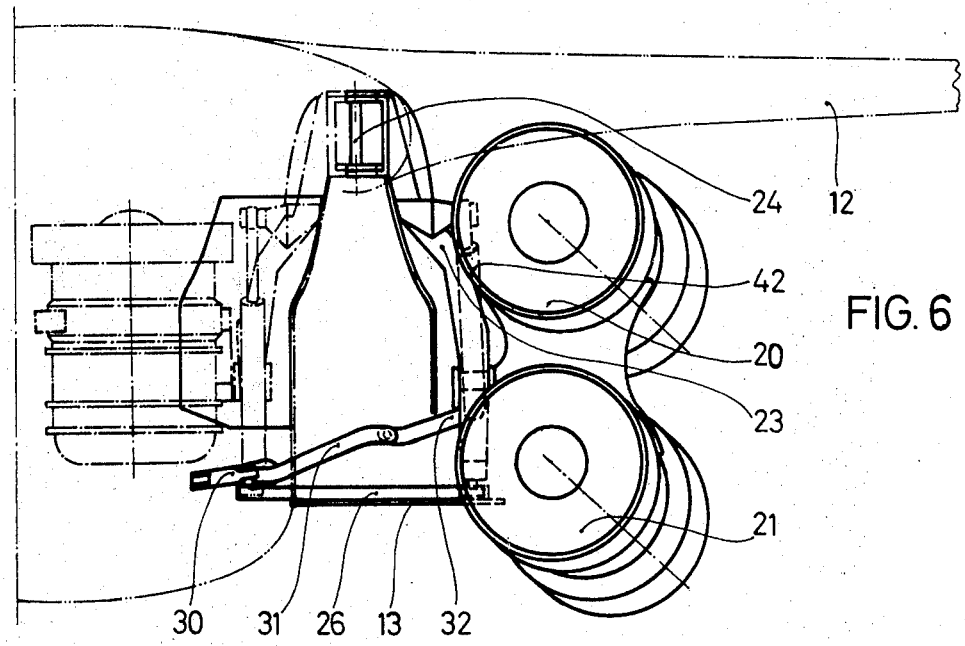
FIG. 6 is a side view of the apparatus illustrated in FIG. 4.
Figure 4:
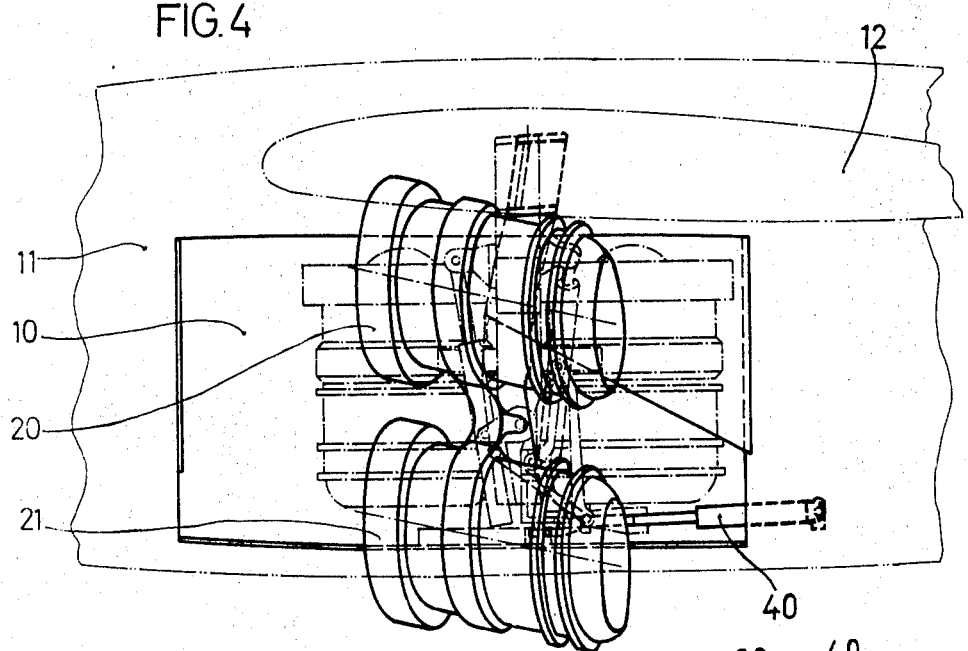
FIG. 4 is a side view of the apparatus illustrated in FIG. 1 with the engines extended and in position for cruise flight.
Figure 5:
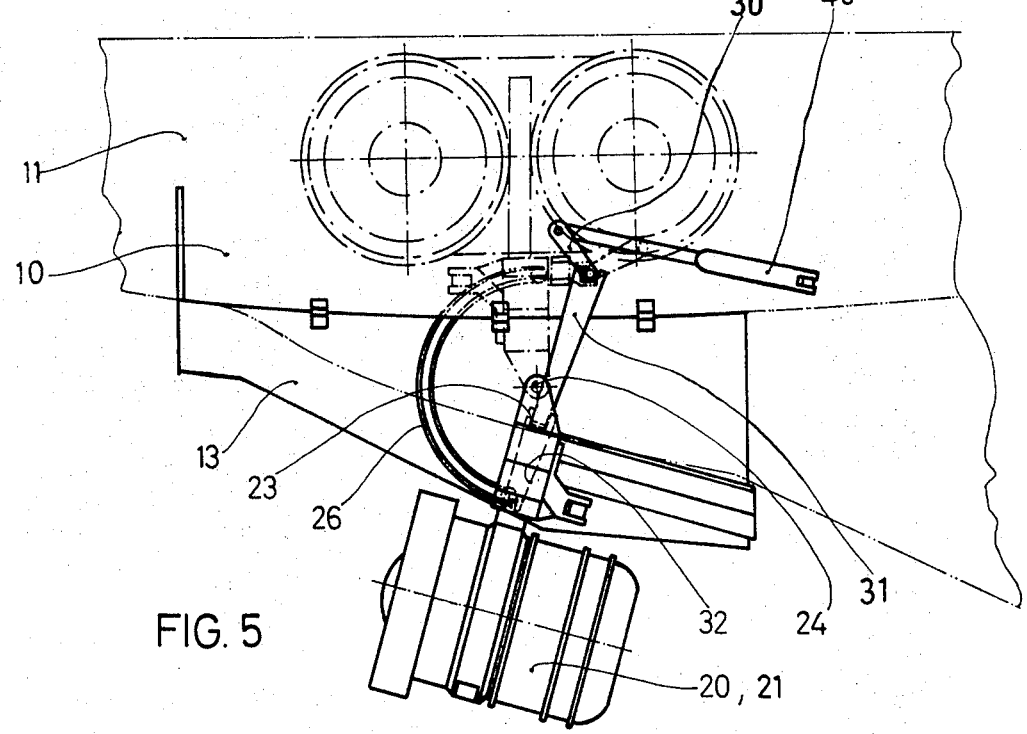
FIG. 5 is a top view of the apparatus illustrated in FIG. 4.

With reference to the drawings, jet engines 20 and 21 are arranged in pairs according to the illustrated embodiment and can selectively be swung from this storage position within a compartment 10 defined by a fuselage 11 to their operational position. Serving to facilitate such positioning is a mechanism composed of links 30, 31, and 32 which are actuated by a hydraulic driving cylinder 40. Serving to provide the largest possible angular swing and to further eliminate the conventional gear arrangement usually included in prior arrangements, the drive mechanism is such that the axis 41 of the driving cylinder 40 lies in a plane which is not normal to the driven axis 24 of the mount supporting the engines 20 and 21. The engines 20 and 21 are mounted upon a swivel arm 23 which is mounted pivotally upon a wing structure 12. A link 32 acts upon the swivel arm 23 causing it to swing with respect to the driven axis 24. The vertical axis 24 of the engine carrying arm 23 is offset relative to the vertical axis 28 so that the transmission of the angle of movement of the lever 31 to the extending arm 23 of the power units will be made possible. The lever 31 is rotatable about a vertical axis 28 and also pivotally mounted to lever 30 about a horizontal axis 28A running through vertical axis 28 such that upon actuation, lever 31, as seen in FIG. 1, pivots downwardly about the horizontal axis 28a while simultaneously rotating about vertical axis 28. The lever 30 acts much like a crank with regard to causing the rotation of lever 31. A guide track 26 and a roller 25 mounted on the lower end of arm 23 determine the path of movement and ensure freedom of movement of the engines and their supporting apparatus. Upon rotation of arm 23 about axis 24 the engines are caused to swing outwardly along the path defined by trackway 26 and levers 31 and 32 straighten out to the extended position as arm 23 travels farther from its original position. It is to be understood that lever 32 is connected to arm 23 by a gimbal arrangement which permits relative universal movement between the two elements. With respect to the illustrated embodiment, the guide U-shaped track 26 is mounted on a door 13, and the door 13 thus serves to support the thrust forces. The door 13 is pivoted to the open position by a direct drive, such as a power spindle arrangement. Locking of the door 13 with the extending arm 23 will guarantee the transmission of the thrust of the power units to the horizontally lying lateral doors 13 and to the fuselage frame. Locking is accomplished by means of a simple bolt which upon reaching the end position of the power unit drops into a corresponding bore. In the extended position, the engines 20 and 21 can selectively be pivoted into a cruise or a lift position by means of a cylinder 42.

The cylinder 40 is attached to a support on the inside of the airframe. The axis 24 is mounted in the space between the fuselage and the wing root on the inside of the airframe. Through the forced guidance of the toggle lever 31 on trackway 26, the entire arrangement executes a rotational angle of 160° with an input angle of approximately 90° carried out by the lever 30 and its drive 40.

With regard to prior arrangements, the use of hydraulic cylinders which serve as the drive mechanisms frequently results in the piston rods and the axes of the levers interfering when the swing-out angle exceeds 90 degrees. The linkage mechanism of the illustrated mechanism utilizes a single actuating or swing-out cylinder and thus provides a swing-out angle of between 160 and 180 degrees.

The use of a locking device for each of the end positions and the particular door construction illustrated provides support for the thrust forces and results not only in a relatively smooth operation during the entire swing-out process, but also increases structural stability and reduces vibration during VTOL operation.

Although but one specific embodiment of this invention has been herein shown and described it should be understood that certain details of the construction shown may be altered without departing from the spirit and scope of this invention as defined by the following claims.

I claim:

1. An apparatus particularly adapted for positioning the lift engines of a vertical take-off and landing aircraft from a first position within a storage compartment defined by the airframe to a second operational position, comprising a linkage mechanism, the driving axis of said linkage mechanism being in a plane which is not normal to the driven axis, said linkage mechanism being capable of swinging the lift engines through an angle in excess of 160 degrees, a door for selectively obstructing the opening of said compartment, and a guide track mounted upon said compartment door serving to determine the path of movement of said lift engines.

2. An apparatus according to claim 1 which additionaly includes a hydraulic actuating means serving to actuate said linkage mechanism.

3. An apparatus according to claim 2 which includes a swivel arm serving to support said engines and wherein said linkage mechanism is hingedly secured to said swivel arm.

4. An apparatus according to claim 3 including a guide roller rotatably secured to said swivel arm and a guide track engaging said guide roller for guiding the engines along a predetermined path during movement between said first and said second positions.

References Cited

UNITED STATES PATENTS

| | | | |
|---|---|---|---|
| 2,422,744 | 6/1947 | O'Neil | 244—74 |
| 3,154,916 | 11/1964 | Eichholtz | 244—54 |
| 3,302,907 | 2/1967 | Wilde et al. | 244—55 |
| 3,445,079 | 5/1969 | Burns | 244—54 |

MILTON BUCHLER, Primary Examiner

J. E. PITTENCER, Assistant Examiner